J. B. RAINES.
Corn Planter.
No. 64,143.
Patented Apr. 23, 1867.
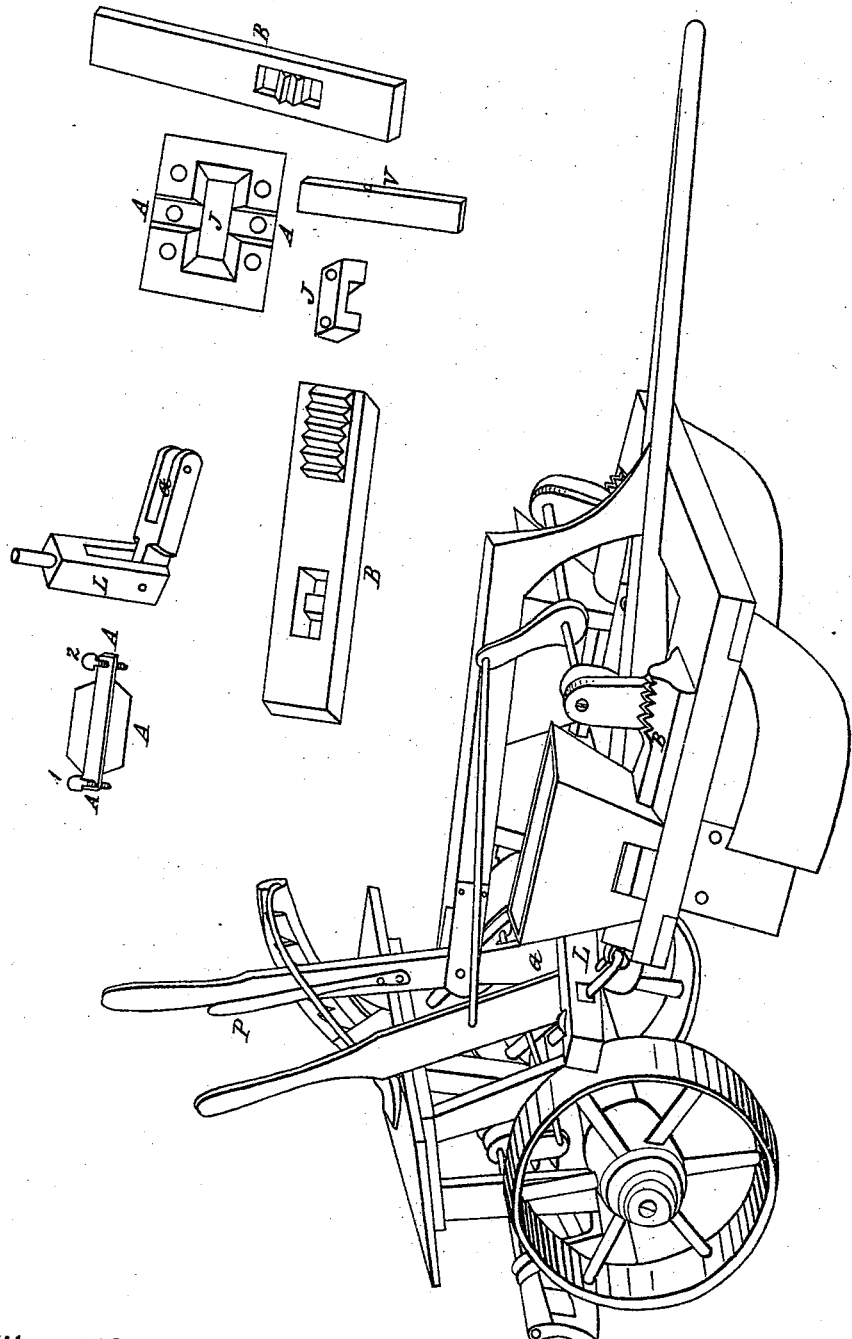
Witnesses:
C. Bond
M. D. West Bond

United States Patent Office.

JOHN B. RAINES, OF FREMONT, IOWA.

Letters Patent No. 64,143, dated April 23, 1867.

---

IMPROVEMENT IN CORN-PLANTERS.

---

The Schedule referred to in these Letters Patent and making part of the same.

---

Be it known that I, JOHN B. RAINES, of Fremont, in the county of Mahaska, and State of Iowa, have invented a new and useful Improvement on Corn-Planters, the improvement being in the dropping apparatus; and I do hereby declare that the following is a full, clear, and exact description of the construction and operation of the same, reference being had to the annexed drawings, making a part of this specification, in which—

Letters A A A represent the cut-off, and letter J represents the dies. The letters A A represent the bottom of the box in which the corn is placed, and the dark spots on this plate represent the holes where the screws go to to fasten it to its place.

The Figures 1 and 2 show the two thumb-screws which fasten down the cut-off A A A.

The advantage my improved dies have over others is, the cut-off and plate are so bevelled and constructed as to prevent the corn from being drawn under and cracked, as is often the case with other droppers. Another advantage is the dies can be easily changed from large to small, and from small to large, to suit the size of the corn or the number of grains to be dropped, by turning the two thumb-screws marked 1 and 2, and lifting it off preparatory to placing in another die.

What I claim as my invention is—

The cut-off, represented in the drawings by the letters A A A, and the dies, represented by the letter J, and the bottom of the box in which the corn is placed, represented by the letters A A.

JOHN B. RAINES.

Witnesses:
 IRA BARR,
 JAMES WHITE.